G. THOMAS.
WEEDER.
APPLICATION FILED JAN. 12, 1910.
983,952.
Patented Feb. 14, 1911.
2 SHEETS—SHEET 1.
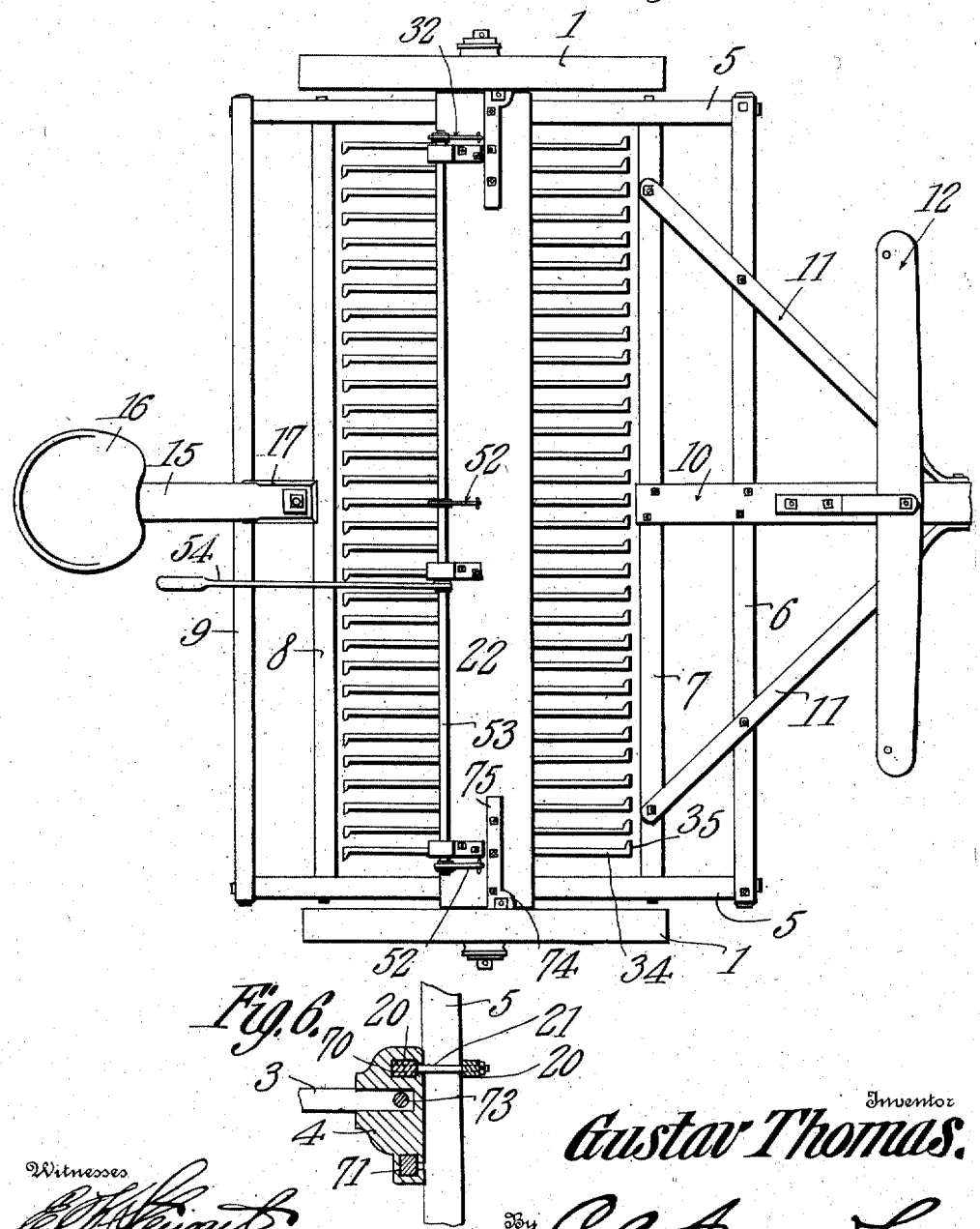
Witnesses
Inventor
Gustav Thomas.
By CA Snow & Co.
Attorneys

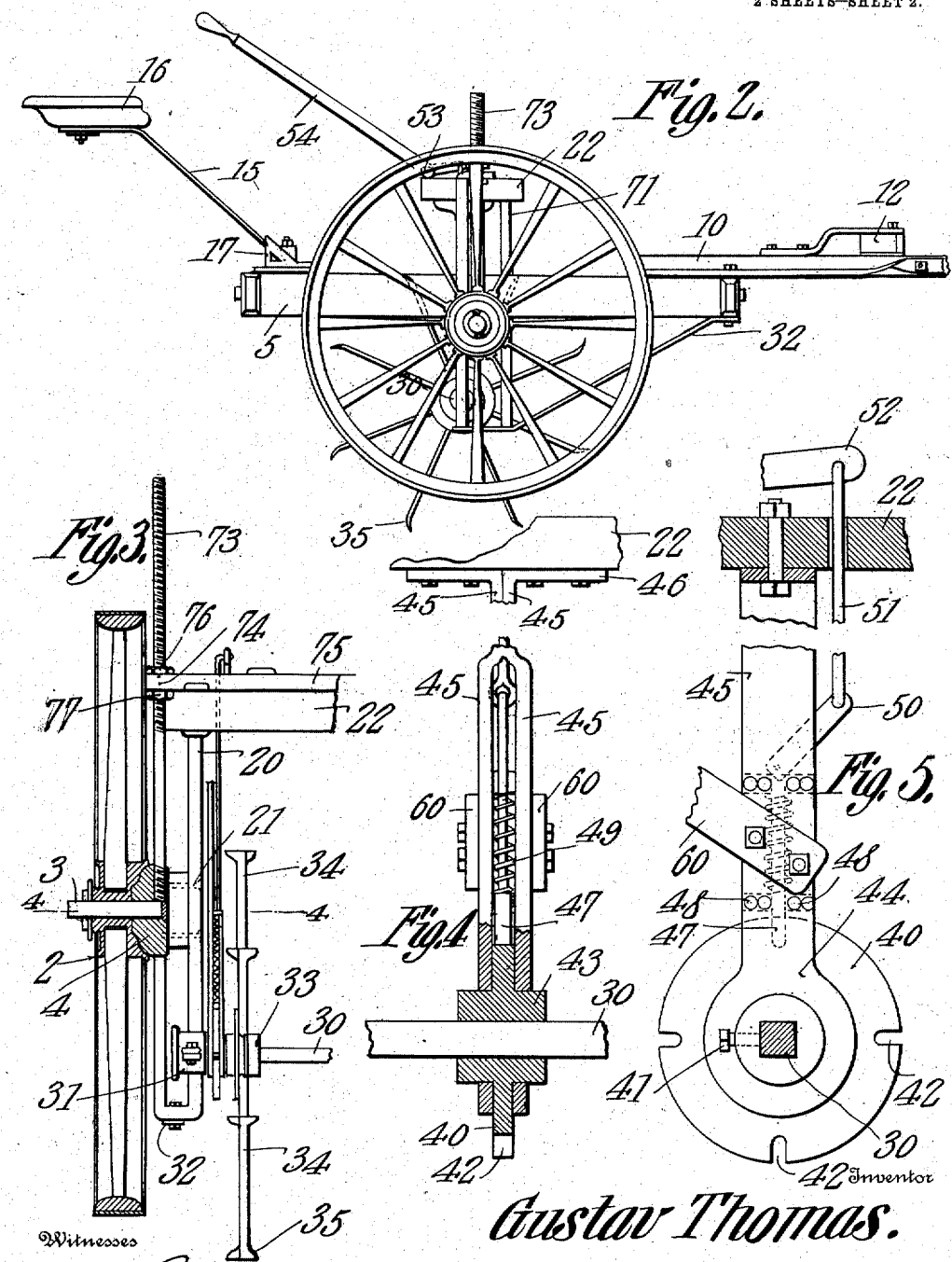

UNITED STATES PATENT OFFICE.

GUSTAV THOMAS, OF LIND, WASHINGTON.

WEEDER.

983,952. Specification of Letters Patent. Patented Feb. 14, 1911.

Application filed January 12, 1910. Serial No. 537,719.

*To all whom it may concern:*

Be it known that I, GUSTAV THOMAS, a citizen of the United States, residing at Lind, in the county of Adams and State of Washington, have invented a new and useful Weeder, of which the following is a specification.

This invention relates generally to cultivators and particularly to weeders.

The object of the invention is to provide a strong, simple, durable and thoroughly efficient machine for removing weeds and performing other cultivating operations.

With the foregoing and other objects in view, which will appear as the description proceeds, the invention resides broadly in the combinations and arrangements of parts, and specifically in the details of construction, specified in the different appended claims.

In the accompanying drawings forming part of this specification: Figure 1 is a plan view of a machine constructed in accordance with the invention. Fig. 2 is a side elevation thereof. Fig. 3 is a vertical transverse section, partly in elevation, taken through one side of the machine. Fig. 4 is a horizontal section on the line 4—4 of Fig. 3. Fig. 5 is a transverse vertical section, partly in elevation, showing in detail the means for preventing rotation of the ground-engaging or cutter element. Fig. 6 is a detail view taken at a right angle to Fig. 5.

Like reference numerals indicate corresponding parts in the different figures of the drawing.

The machine of the present invention, generally considered, consists of running gear or wheels and a frame supported by the running gear. Means are provided for raising or lowering the frame upon the running gear. Suitably connected with the frame is a ground-engaging element or cutter which is adapted to rotate partially from time to time, and is preferably made up of a plurality of radially extending arms provided at their outer ends with cutters, said arms or cutters being arranged in sets or banks, all the cutters of each set being arranged approximately in line with each other. Suitable means are provided to prevent rotation of the ground-engaging element, so that one or more sets of its cutters will project into the ground for removing weeds or for other purposes. The cutter arms act as rake members for gathering the weeds and carrying them along with the machine. At suitable intervals the ground-engaging element is permitted to make a partial rotation for the purpose of dumping the accumulated weeds in the form of a windrow. By raising or lowering the main frame on the running gear, it will be apparent that the ground-engaging element is caused to project a lesser or greater distance into the soil or is raised completely out of contact therewith.

Having thus briefly outlined the general features of the machine, in order to facilitate a clear understanding thereof, a specific description of one embodiment of the invention will now be given.

The reference numerals 1—1 indicate the wheels or running gear. These wheels, as shown in Fig. 3, are provided with the usual hubs 2 from which project stud shafts or axles 3. Each axle 3 is supported in a block 4 of any desired shape or size.

The frame of the machine is shown best in Figs. 1, 2 and 3 and consists preferably of the side bars 5—5 which are connected together by two front cross pieces 6 and 7 and two rear cross pieces 8 and 9. Suitably connected with the front cross pieces 6 and 7 of the frame are the tongue 10 and the tongue braces 11, 11. Mounted on the tongue 10 is the usual doubletree 12. The two rear cross pieces 8 and 9 of the frame support the stem 15 of the driver seat 16, said stem 15 being received in a bracket 17 suitably fastened on said cross pieces 8 and 9. Bolted or otherwise suitably secured to each side piece 5 of the frame, as shown best in Figs. 3 and 4, is a stirrup iron or hanger 20 which is approximately U-shaped, as shown, the bolts for securing said stirrup iron to the side pieces 5 being indicated by the numeral 21. The lower or closed portion of each stirrup iron extends some distance below the side piece 5 and the upper ends of each stirrup iron extend some distance above said side piece 5. Extending transversely across the machine and supported on the upper ends of the stirrup irons 20 is an upper frame piece or plank 22.

The ground-engaging element or cutter, which is supported by the above described frame, will now be taken up. This cutter includes a non-circular or square shaft 30, the ends of which are suitably rounded and fit into bearings or boxes 31, bolted or otherwise fixed on the stirrup irons 20, as shown in Fig. 3. The stirrup irons 20 and shaft 30 are made rigid by means of the braces 32, which connect the lower ends of the stirrup irons 20 with the forward ends of the side pieces 5 of the frame, as shown in Figs. 2, and 3. Mounted upon the non-circular intermediate portions of the shaft 30 are a plurality of hubs 33 in which are bolted or otherwise removably secured a plurality of radially extending cutter arms 34 carrying at their other end cutters 35, which may be of any desired form and character. As shown in Figs. 1 and 3, each cutter 35 is laterally extended in one direction, and the cutters are so arranged in the hubs 33 that the lateral extensions thereof are arranged so as alternately to project in opposite directions, that is to say, the extension of one cutter in the hub 33 projects toward the left side of the machine and the extension of the next succeeding cutter projects toward the right side of the machine, so that when two cutters are simultaneously in the ground, their cutting edges will produce the effect of one broad cutter, as shown at the bottom of Fig. 3. The cutters in the different hubs 33 throughout the length of the shaft 30 are arranged in line with each other, as shown in Fig. 2, so as to produce a plurality of sets or banks of cutters. As previously indicated, the ground-engaging element, which includes the cutters 35, is held normally against rotation, for which reason two sets of cutters project into the ground, as indicated in Fig. 2, and thus uproot the weeds and cultivate the soil during the movement of the machine; any weeds which are not taken up by the first set of cutters being caught by the second set.

When weeds accumulate in the cutters and it is desired to dump the same in the windrow, the ground-engaging element is permitted to rotate backward one or two steps. The means for holding the ground-engaging element against rotation and permitting its backward movement at the proper time will now be described. This means preferably includes a plurality of disks 40, shown best in Figs. 5 and 6 of the drawing, each of the disks 40 being secured to the shaft 30 by means such as the set screws 41, and having in its periphery a series of notches or depressions 42. Surrounding the hub 43 of each disk 40 is the lower end 44 of a support 45, which is bolted at its upper end 46 to the upper frame piece 22. The two supports 45 which are arranged adjacent each disk 40, as shown in Fig. 5, are disposed closely together at their upper ends and at their lower ends are separated by a distance equal to the width of the disk 40. Arranged in the space between the supports 45—45 is a plunger 47 which is adapted to fit into any one of the notches 42 in the disk 40. The plunger 47 slides between bolts or guides 48 and is normally impelled downward into one of the notches 42, by means of a coiled spring 49. At its upper end the plunger 47 is provided with an angular extension 50 with which is connected a link rod 51. The link rod 51, at its upper end, extends through the upper frame piece 22 and is connected with a crank 52 upon a shaft 53, which extends longitudinally of the upper frame piece 22, as shown best in Figs. 1 and 2. Adjacent its center, said shaft 53 has rigidly connected therewith an operating handle 54 which projects into proximity with the seat 16. As shown in Fig. 1, the shaft 53 has three crank members 52, each of which is connected by a link 51 with a plunger 47 for controlling a disk 40, three of said disks 40 being mounted on the shaft 30 in order to relieve it of twisting strains.

It will be obvious that any number of disks 40 or similar devices may be mounted upon the cutter shaft 30. When the cutter arms are clogged with weeds, and it is desired to dump them, the operating handle 54 is depressed, so as to withdraw the plungers 47 from the disks 40. The traction of the cutter arms in the ground causes the ground-engaging element to rotate backward and dump the weeds in the form of a windrow. As soon as the handle 54 has been operated and released, the spring 49 holds the plunger 47 against the periphery of the disk 40 in position to snap into the next notch 42, and thus prevent further rotation of the ground-engaging element. The supports 45 of disks 40 preferably are strengthened by means of the braces 60, shown in Figs. 5 and 6, the forward ends of said braces being suitably secured to the frame.

The means for raising and lowering the frame and ground-engaging element upon the wheels, for the purpose of causing the cutters to project a lesser or greater distance in the ground, will now be described, with particular reference to Figs. 3 and 4. As shown in Fig. 4, the axle support or block 4 is provided with a groove 70 which partially surrounds the outer portion of the stirrup iron 20, so as to permit said stirrup iron to slide in said block. A second guide member 71, shown best in Figs. 2 and 4, is connected at its upper end to the upper frame piece, and at its lower end to the brace 32. A rod 73 is threaded at its lower end into the block 4. The upper end of the rod 73 is threaded and projects through a perforated ear 74 in a plate 75, bolted or otherwise secured to the upper frame piece 22, at the end thereof. The rod 73 is provided above and below the ear 74 with nuts 76 and 77, by adjusting which the frame of the machine is raised or lowered upon the wheels.

It will be noted that the machine can be readily disassembled for the purpose of removing and replacing cutters and the making of changes and repairs.

The machine of the present invention is strong, simple, durable and inexpensive in construction, as well as thoroughly efficient for the purpose of removing weeds or otherwise cultivating the soil.

What is claimed is:

1. A weeding and cultivating machine comprising running gear, a frame, a shaft supported by the frame and having cutter arms thereon, a disk fixed on said shaft and having radial slots extending inward from the periphery thereof, a plunger for engaging the slots of said disk, and means for operating said plunger.

2. A weeding and cultivating machine comprising running gear, a frame vertically adjustable on the running gear, rotatable cutters supported by the frame, a disk connected with said cutters having radial slots extending inward from the periphery thereof, a spring operated plunger for engaging the notches of said disk to hold said cutters against rotation, and a handle for operating said plunger.

In testimony that I claim the foregoing as my own, I have hereto affixed my signature in the presence of two witnesses.

GUSTAV THOMAS.

Witnesses:
J. R. BURRILL,
GEO. TAYLOR.